Patented Jan. 31, 1928.

1,657,700

UNITED STATES PATENT OFFICE.

ARTHUR C. SPENCER, OF WASHINGTON, DISTRICT OF COLUMBIA, ASSIGNOR TO THE PERMUTIT COMPANY, OF NEW YORK, N. Y., A CORPORATION OF DELAWARE.

PROCESS OF MODIFYING GLAUCONITE.

No Drawing. Application filed February 26, 1923, Serial No. 621,475. Renewed February 11, 1926.

This invention relates to processes of modifying glauconite; and it comprises a method of modifying the physical and chemical properties of glauconite wherein such glauconite is baked or heated to a comparatively high temperature, say as high as 600° C., and is thereafter treated with water and alkali, as by moistening with caustic soda and exposing to steam under pressure, the excess of alkali being thereafter removed, as by washing or treating with more or less acid material; all as more fully hereinafter set forth and as claimed.

Greensand is a material occurring in many places in this country as beds or deposits; and is a mixture of various earthy matters and minerals, among which the substance called glauconite always occurs. Glauconite is substantially a hydrated double silicate of iron and potassium, although it may contain other bases as minor constituents. In part, the iron is present in the ferrous condition, and in part, at least frequently, in the ferric condition. Some alumina may be present replacing part of the iron and some of the potassium may be replaced by sodium, calcium and magnesium. The glauconite occurs in the form of small rounded granules; these granules, though consisting of a crystalline mineral, being generally of a more or less concretionary structure. Glauconite is regarded as of marine origin, being produced by various chemical reactions taking place in seawater and in or around a nucleus of some sort; whence the structure.

Glauconite has found use as a source of potash and as a purifying agent in softening water. For the former purpose, it owes its value to its power of yielding up its potassium in exchange for other bases by various metathetical reactions. In purifying water, it is used as a softening agent in a way analogous to that in which the various artificial zeolites are employed; water to be softened being transmitted through a granular bed of glauconite which abstracts the hardness-giving impurities, calcium and magnesium (lime and magnesia). After a time, the glauconite is regenerated by the passage of a salt solution therethrough. It now gives up its calcium and magnesium thereto, taking up sodium in their lieu by metathesis or exchange.

For softening water, glauconite has many technical advantages. One is that it is not attacked or broken down by water, even very soft water, withstanding high temperatures in contact with soft water containing little or no saline matter and even in contact with water showing some acidity. Although the ordinary types of artificial exchange silicates or zeolites are considered insoluble in water and as withstanding its action, there are some waters which are more or less "aggressive" to such silicates and in which they do, or may, disintegrate to some slight extent under the conditions mentioned. Such waters are not common, but they do occur. Generally, they are characterized by the absence of the minute traces of silica ordinarily found in water. When such a slight disintegration occurs, it is usually indicated by the presence of a little silica in the effluent. And it has been found that the amount of $SiO_2$ in the effluent of a softener charged with ordinary zeolites and operating on a hot, not very hard water is higher than that in the effluent from a softener treating the same water and charged with glauconite. Another advantage of glauconite is that it is relatively dense and heavy, being an iron-containing mineral. As materials of this character are used in granular beds, it is often desirable that the material be fairly heavy to prevent loss by flotation.

Raw glauconite used for softening water is subject, however, to certain disadvantages; one of which is giving up a greenish turbidity to water for some time after a charge is placed in use; this being due apparently in some measure to disintegration or loosening of adventitious impurities. It is the purpose of the present invention to improve it as regards its physical properties and also as regards its metathetical or exchange properties. To this end, the glauconite is first purified in any suitable way to free it as far as may be of the accompanying minerals and earthy matters of the natural greensand and is then baked somewhat to dehydrate it and is rehydrated by an alkali; being afterwards, if it be deemed necessary, freed of the alkali by an acid or acid-reacting salt. In the preliminary purification, any of the ordinary and accepted washing or mechanical or magnetic treatments may be employed.

With the most thorough of these preliminary purifications, the glauconite granules are apt to contain or carry more or less adventitious clayey matter. Under the microscope, the granule surfaces are seen to be not wholly smooth; a fact which is in itself advantageous, since it increases the surface area available for contact with water but which leads to the holding of a certain amount of this adventitious matter. Sometimes it is quite firmly held. And in any lot of glauconite, there is a certain proportion of soft granules, or granules having soft portions; a fact which is probably responsible, at least in some measure, for the stated phenomenon of the appearance of a greenish turbidity for some time after a glauconite softener has been put in use. While the sheer amount of this disintegrable matter must always be very small in any well purified glauconite, its presence is undesirable.

By baking the glauconite through a moderately high range of temperature, say, up to about 600° C., soft glauconite is hardened and put in such condition as to resist the action of water and the saline solutions used in regenerating used softeners; and the same is true of any adventitious clayey matter which may be present. By baking, the clay is rendered hard, rigid and pervious. The effect of the baking on the glauconite is to render it somewhat more amorphous and better adapted for exchange purposes.

Glauconite in its natural state is, however, a hydrated mineral; it contains "water of constitution" and this water of constitution is driven off in the baking to a greater or less extent; the loss being the greater the higher the temperature and the longer the duration of the heating. Baking is not carried on in such a way as to result in sintering or partial fusion with conversion of the material from one having glauconitic characteristics to one of different character; but it does result in dehydration. And it is of advantage to the material for exchange purposes that it be rehydrated to at least a certain extent. This may be done in various ways. One is to boil or heat the baked material with a sodium chlorid solution for a time. Another is to heat the baked glauconite with an alkaline material, such as caustic lime, in the presence of water. Or a calcium chlorid solution may be used. In treating with lime or calcium chlorid, a certain amount of calcium (lime) is taken up; and if the material be then treated with a sodium chlorid solution, this lime is removed and replaced by sodium. The material is then highly active and suited for immediate use. A useful expedient is to treat the baked material with a little alkali, as by sprinkling it with caustic soda solution, and then exposing it to steam under pressure. The condensation of the steam produces, or may produce, a considerable amount of water; and in this event it is useful to use a rather concentrated soda solution initially. The same results may be accomplished by covering the baked glauconite with a weak soda solution, say of 1° or 2° Baumé; and heating the two together.

Glauconite baked to a temperature not to exceed 600° C. (that is, short of the point where it will sinter, fuse, semi-fuse or change materially in character) and then treated with alkali and steam under pressure, or simply boiled with a weak alkali solution, as the case may be, offers a highly active material for softening water, having good exchange properties, giving up no fines or turbidity to water and of hard, rigid character, well withstanding the somewhat trying mechanical conditions in a softener. In a softener, in addition to the flow of water to be softened and of salt solution for regeneration, there is a special cleansing flow used from time to time in what is known as "backwashing". Water, even if filtered as it should be, carries or deposits more or less insoluble matter on the granules of the softener, clogging the bed or reducing the speed of flow of water after a time. It is the practice to remove this matter by a strong flow of water in the opposite direction; upwardly, if the softening has been with the water flowing downward. The strong flow washes off deposited materials, lifts the granules and produces a resizing effect in the bed, etc., but incidentally it causes a considerable amount of inter-granular friction.

After the alkali treatment, the alkali remaining in, or with, the granules can be removed by washing with water or with salt solution; or it can be obviated by the use of neutralizing agents, such as a little weak hydrochloric or sulfuric acid, or an acid-reacting salt, such as a solution of aluminum sulfate, niter cake (acid sodium sulfate), etc.

In an advantageous embodiment of my invention, the raw greensand as mined or dug is washed to free it of mud and objectionable foreign matters and dried at a low temperature, and screened. The greensand as mined contains, in addition to granular glauconite of suitable size for the present purposes, very fine granules, which are undesirable for use, and more or less lumpy and clayey material. By drying at a low temperature, screening is facilitated. In drying, the clayey material is made disintegrable and most of it can be removed as fine dust during screening. Washing can be prior or subsequent to the drying and screening. Drying may be omitted if the material is washed and is screened under water. Washing, drying and screening are merely preliminary steps in the present process and their desirability depends, of course, upon the characteristics of the raw material as it comes to the factory. With a pure article of greensand, there may be but a small amount of adventitious constituents and it is then sometimes desirable to bake the material as it comes, without troubling to wash and screen. Small amounts of impurities present can be, to a large extent, mechanically removed in the subsequent steps. Material between 10 and 50 mesh fineness is most advantageous for the present purposes. The material which has been washed, screened, etc., or not, as the case may be, is subjected to a gradually increasing heat in any suitable furnace, until it reaches a temperature of about 600° C. At this temperature it is held for a period of time, depending somewhat upon the charge and the heating means. Generally, I heat at least 30 minutes and I may heat as long as two hours. A washing and screening may follow this baking treatment, in which event washing and screening prior to baking is usually not resorted to. The baked material is next rehydrated by being heated in the presence of a liquid of alkaline reaction. As previously stated, it may be moistened with an alkali solution and then exposed to steam under pressure; or it may be simply immersed in a weak alkali solution and heated. The glauconite may be treated with a boiling solution of weak alkali. Rehydration under the influence of the alkali solution will take place in the cold but it is better to rehydrate hot. Various liquids of alkaline reaction may be used, but caustic soda is most advantageous. Solutions of sodium silicate or "waterglass", which is an alkaline material, have advantages in certain relations. Solutions of sodium or potassium carbonate may also be employed. In using caustic soda, the solution may be 20° Baumé or stronger, but I generally find it advantageous to use a strength of about 5° Baumé, and still weaker solutions are at times used. Strong solutions of caustic soda give the glauconite a somewhat greater exchange power than do weaker, but the use of strong solutions is sometimes accompanied by a softening or disintegration of the material. With weak solutions, the greensand may be kept in contact with the boiling solution for a period of time ranging between, say, 15 minutes and two hours or so; the time required being to some extent inversely to the concentration of the liquid. Rehydration, as stated, may be effected in the cold but takes longer. In the cold, that is, at ordinary temperatures, somewhat stronger alkali solutions are advisable than when working at temperatures of, say, 100° C.

After rehydration, the excess of alkali solution is drained off and the material may then be simply washed. It is however, I find, better to effect a more positive removal of the excess of adhering alkali remaining after drying; and to this end, the drained material may be treated with a weak solution of acid, or acid-reacting materials, such as aluminum sulfate, in the amount necessary to neutralize adhering alkali. A solution of commercial aluminum sulfate of about 1 to 5° Baumé gives good results. The treated greensand may be exposed to the action of the amount of such a solution required to neutralize the apparent alkalinity, using phenolphthalein or the like as an indicator. In order to secure effective contact and permeation, I usually allow the glauconite to stand with the aluminum sulfate solution for a time, say, 30 to 60 minutes. Agitation quickens neutralization. In using aluminum sulfate in this way, after the action of the solution is completed, the excess is drawn off, the material washed somewhat and redrained. It is now ready for use. It may be used in the moist condition in which it is left by the final washing, or it may be dried for shipment.

Glauconite treated in the manner just described is of increased hardness and does not yield turbidity to the water in the exchange apparatus. The exchange power of the material after treatment is often increased 20 per cent or more.

Instead of using aluminum sulfate as the neutralizing agent, various other acid reacting saline solutions, such as solutions of ferrous or ferric chlorid, may be employed. Various saline solutions which are not strictly neutralizing agents may be used in obviating the the excess of alkalinity of the treated material, as, for example, solutions of calcium chlorid or magnesium sulfate.

What I claim is:—

1. In the improvement of glauconite, the process which comprises baking such glauconite and afterwards treating with an alkali.

2. In the improvement of glauconite, the process which comprises baking such glauconite and afterwards treating with caustic soda solution.

3. In the improvement of glauconite, the process which comprises baking such glauconite, treating with an alkali solution and afterwards removing the alkali.

4. In the improvement of glauconite, the process which comprises baking such glauconite, treating with an alkali solution and afterwards removing the alkalinity with the aid of an acid reacting material.

5. In the improvement of glauconite, the process which comprises baking glauconite to a temperature progressively increasing to about 600° C., cooling the heated glauconite and treating with an alkali solution.

6. In the improvement of glauconite, the process which comprises baking glauconite at a temperature progressively increasing to about 600° C., cooling the heated glauconite, treating with an alkli solution, and afterwards removing the alkalinity with the aid of an acid reacting material.

In testimony whereof, I have hereunto affixed my signature.

ARTHUR C. SPENCER.